US012567160B2

(12) United States Patent (10) Patent No.: US 12,567,160 B2
Wan et al. (45) Date of Patent: Mar. 3, 2026

(54) ALIGNMENT OF DENSE POINT CLOUDS OF A PHYSICAL OBJECT

(71) Applicant: Telefonaktiebolaget LM Ericsson (publ), Stockholm (SE)

(72) Inventors: Fengkai Wan, Bromma (SE); Jiangning Gao, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 151 days.

(21) Appl. No.: 18/565,922

(22) PCT Filed: Jun. 1, 2021

(86) PCT No.: PCT/SE2021/050507
§ 371 (c)(1),
(2) Date: Nov. 30, 2023

(87) PCT Pub. No.: WO2022/255912
PCT Pub. Date: Dec. 8, 2022

(65) Prior Publication Data
US 2024/0257363 A1 Aug. 1, 2024

(51) Int. Cl.
G06T 7/30 (2017.01)
G06T 5/70 (2024.01)
G06T 17/00 (2006.01)

(52) U.S. Cl.
CPC .................. G06T 7/30 (2017.01); G06T 5/70 (2024.01); G06T 17/00 (2013.01); *G06T 2207/10028* (2013.01)

(58) Field of Classification Search
None
See application file for complete search history.

(56) References Cited

U.S. PATENT DOCUMENTS 6,920,242 B1 7/2005 Moore et al.
9,286,682 B1 3/2016 Carr et al.
(Continued)

OTHER PUBLICATIONS

International Search Report and Written Opinion issued in International Application No. PCT/SE2021/050507 Jan. 31, 2022 (12 pages).

(Continued)

*Primary Examiner* — Frank S Chen
(74) *Attorney, Agent, or Firm* — Rothwell, Figg, Ernst & Manbeck, P.C.

(57) ABSTRACT

There is provided mechanisms for aligning different DPCs of a physical object. A method is performed by an image processing device. The method comprises obtaining DPCs captured from different orbits around the physical object. The method comprises aligning the DPCs with each other. The method comprises selecting, in a first stage, a first DPC of the DPCs as a first reference DPC and individually aligning all remaining DPCs with the first reference DPC, resulting in a first alignment of the DPCs. The first alignment of the DPCs yields a first value of an alignment metric per each of the DPCs except the first DPC. The method comprises selecting, in a second stage, a second DPC of the DPCs as a second reference DPC and individually aligning all remaining DPCs, except the first DPC, with the second reference DPC, resulting in a second alignment of the DPCs. The second alignment of the DPCs yields a second value of the alignment metric per each of the DPCs except the first DPC and the second DPC. The method comprises selecting, for each of the DPCs except the first DPC and the second DPC, that of the first alignment of the DPCs and the second alignment of the DPCs yielding best value of the alignment metric.

19 Claims, 8 Drawing Sheets

(a)

(b)

(c)

(d)

(56) References Cited

U.S. PATENT DOCUMENTS

| | | | |
|---|---|---|---|
| 2004/0001620 A1 | 1/2004 | Moore et al. | |
| 2007/0086659 A1 | 4/2007 | Chefd'hotel et al. | |
| 2010/0303341 A1* | 12/2010 | Hausler | A61B 5/1079 |
| | | | 382/154 |
| 2013/0004060 A1 | 1/2013 | Bell et al. | |
| 2015/0243073 A1 | 8/2015 | Chen et al. | |
| 2019/0011529 A1 | 1/2019 | Choi et al. | |
| 2019/0290365 A1* | 9/2019 | Gao | A61B 34/20 |
| 2020/0005447 A1* | 1/2020 | Salgian | G06T 17/00 |
| 2020/0043186 A1 | 2/2020 | Selviah et al. | |
| 2020/0074748 A1* | 3/2020 | de Almeida Barreto | |
| | | | G06T 7/0012 |
| 2021/0056716 A1 | 2/2021 | Mörwald et al. | |
| 2021/0347053 A1* | 11/2021 | Lee | B25J 9/1653 |

OTHER PUBLICATIONS

ViDoc, PIX4Dcatch, "Elevate 3D scanning with the power of RTK and photogrammetry on a mobile device", https://www.pix4d.com, Sep. 2, 2021 (6 pages).

Besl, P. J. et al., "A Method for Registration of 3-D Shapes", IEEE Transactions on Pattern Analysis and Machine Intelligence, vol. 14, No. 2, Feb. 1992 (18 pages).

Al-Nuaimi, A., "Methods of Point Cloud Alignment with Applications to 3D Indoor Mapping and Localization", Thesis, Mar. 11, 2017, XP055610258 (156 pages).

Deidda, M. et al., "Modelling A Cell Tower Using SFM: Automated Detection Of Structural Elements From Skeleton Extraction On A Point Cloud", The International Archives of the Photogrammetry, Remote Sensing and Spatial Information Sciences, vol. XLIII-B2-2020, (2020) (8 pages).

\* cited by examiner

100

120

A ········· A

130

(a)

120

(b)

710a (a)

710b (b)

710c (c)

710d (d)

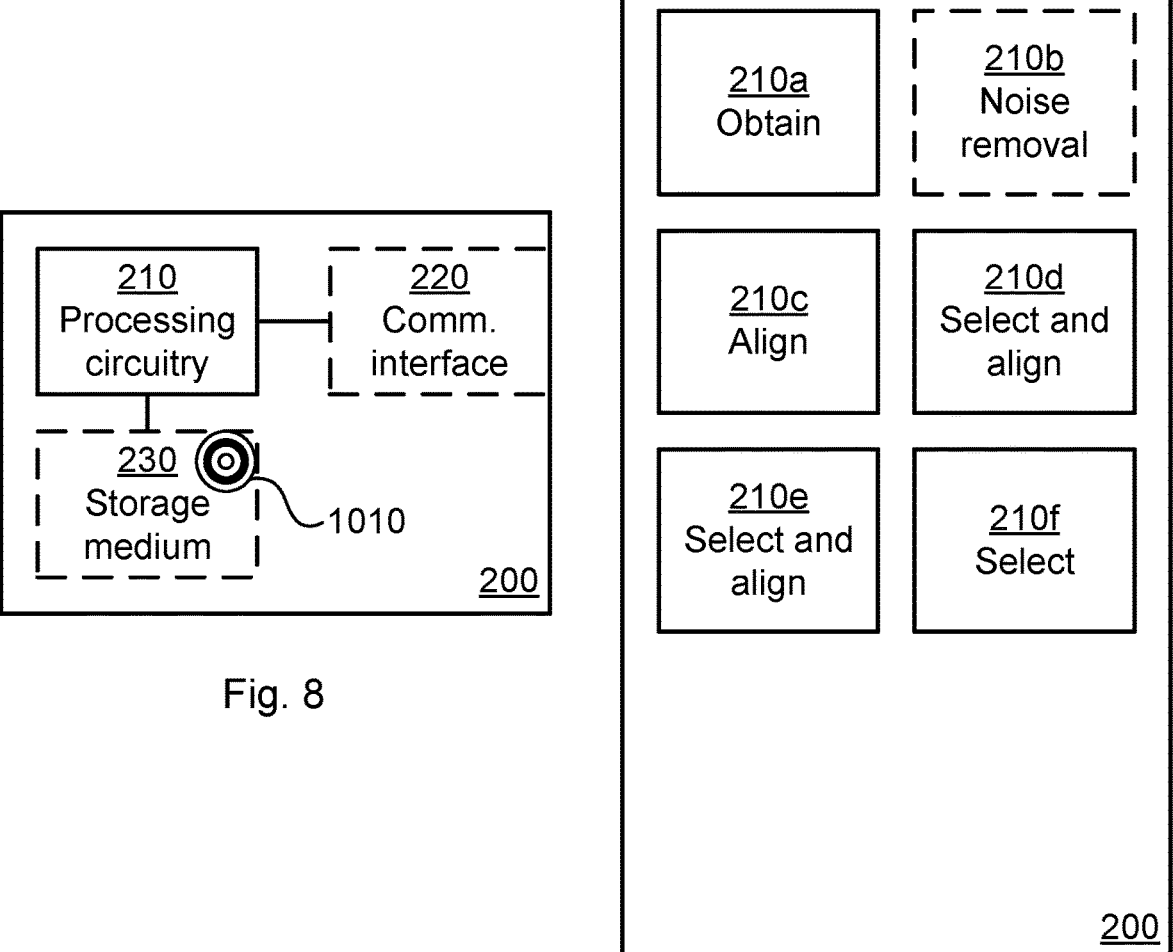
Fig. 8
Fig. 9
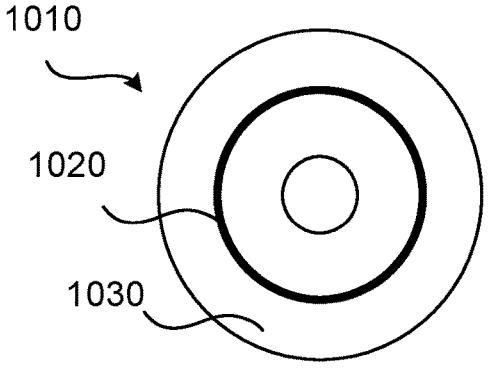
Fig. 10

ALIGNMENT OF DENSE POINT CLOUDS OF A PHYSICAL OBJECT

CROSS REFERENCE TO RELATED APPLICATIONS

This application is a 35 U.S.C. § 371 National Stage of International Patent Application No. PCT/SE2021/050507, filed 2021 Jun. 1.

TECHNICAL FIELD

Embodiments presented herein relate to a method, an image processing device, a computer program, and a computer program product for aligning different dense point clouds of a physical object.

BACKGROUND

In general terms, a point cloud can be regarded as a set of data points in space. The points represent a three-dimensional (3D) shape or object. Hereinafter it will be assumed that the point cloud represents a physical object. Dense point clouds (DPCs) are point clouds with comparably high number of data points, yielding high resolution of the physical object. Each point in the DPC has a set of X, Y and Z coordinates. DPCs are generally produced by 3D scanners or by photogrammetry software, which measure many points on the external surfaces of the physical object. As the output of 3D scanning processes, DPCs are used for many purposes, including to create 3D computer aided design (CAD) models for manufactured parts, for metrology and quality inspection, and for a multitude of visualization, animation, rendering and mass customization applications.

DPCs can be aligned with 3D models or with other DPCs, a process known as point set registration. Hereinafter, alignment will refer to the process of aligning different DPCs with each other.

One benefit of using DPCs will be now be illustrated. FIG. 1 schematically illustrates different views, taken from different types of orbits, of a telecommunication site, commonly referred to as a base station. Assume that a comparison is to be made between the telecommunication site and schematics of the telecommunication site. One way to achieve this is to generate one or more DPCs of the telecommunication site and then comparing the one or more DPCs to the schematics.

Previously, this process would have involved a human operator, technician, or engineer, performing a survey, involving a site visit, or even climbing up the physical structure of the site, and then creating a site drawing. The site drawing would represent the physical structure and properties of the site. An example of a site drawing is provided in FIG. 2. At FIG. 2(a) is shown a sideview of a telecommunication site 100, where the telecommunication site 100 comprises an antenna system 120 and a tower construction 130. At FIG. 2(b) is shown a top view of the antenna system 120 in FIG. 2(a), taken along the cut A-A. The site drawing could be compared to the schematics. This process is tedious and expensive, as well as potentially dangerous as the human operator needs to climb the physical structure.

The comparison between the one or more DPCs and the schematics involves extracting features of the telecommunication site from the one or more DPCs and comparing the extracted features to the corresponding features in the schematics.

To generate the data required for successful feature extraction, the one or more DPCs might need to be generated from images of the telecommunication site as collected from several orbits around the telecommunication site. For each orbit, images from multiple viewpoints can be collected by circulating around each segment of the telecommunication site.

Some examples of how to construct one DPC from all the images captured will be disclosed next.

In a first example, one single DPC is to be generated directly from all images captured during all orbits. However, since some of the images might not have overlapping content, it might be difficult to extract features in one image that match features in another image when generating the DPC. This could result in that some of the images are skipped when generating the DPC, leading to lost details in the DPC.

Therefore, in some examples, one DPC is generated from the images of each orbit. However, the DPCs resulting from different orbits might not be fully aligned with each other.

In a second example, point cloud alignment algorithm is therefore applied to transform the DPCs to their correct positions, thus aiming to achieve alignment. However, point cloud alignment algorithms could be error-prone and result in false positive matches, thus resulting in misalignment. Manual adjustment (post-processing) might thus be required.

In a third example, the alignment is based on identifying a region of interest (ROI) in the physical object. The different DPCs could then be aligned based on the location of the ROI in each DPC. However, this would require manual identification of the ROI in each DPC before the alignment could be performed. As such, the manual identification is time consuming and could be error-prone.

Hence, there is still a need for improved techniques for constructing a DPC from images captured during different orbits around a physical object.

SUMMARY

An object of embodiments herein is to address the above-mentioned problems.

A particular object is to provide techniques that enable construction of a DPC from images captured during different orbits around a physical object, without suffering from the above-mentioned issues, or at least where the above-mentioned issues have been mitigated or reduced.

According to a first aspect there is presented a method for aligning different DPCs of a physical object. The method is performed by an image processing device. The method comprises obtaining DPCs captured from different orbits around the physical object. The method comprises aligning the DPCs with each other. The method comprises selecting, in a first stage, a first DPC of the DPCs as a first reference DPC and individually aligning all remaining DPCs with the first reference DPC, resulting in a first alignment of the DPCs. The first alignment of the DPCs yields a first value of an alignment metric per each of the DPCs except the first DPC. The method comprises selecting, in a second stage, a second DPC of the DPCs as a second reference DPC and individually aligning all remaining DPCs, except the first DPC, with the second reference DPC, resulting in a second alignment of the DPCs. The second alignment of the DPCs yields a second value of the alignment metric per each of the DPCs except the first DPC and the second DPC. The method comprises selecting, for each of the DPCs except the first DPC and the second DPC, that of the first alignment of the DPCs and the second alignment of the DPCs yielding best value of the alignment metric.

According to a second aspect there is presented an image processing device for aligning different DPCs of a physical object. The image processing device comprises processing circuitry. The processing circuitry is configured to cause the image processing device to obtain DPCs captured from different orbits around the physical object. The processing circuitry is configured to cause the image processing device to align the DPCs with each other. The processing circuitry is configured to cause the image processing device to select, in a first stage, a first DPC of the DPCs as a first reference DPC and individually aligning all remaining DPCs with the first reference DPC, resulting in a first alignment of the DPCs. The first alignment of the DPCs yields a first value of an alignment metric per each of the DPCs except the first DPC. The processing circuitry is configured to cause the image processing device to select, in a second stage, a second DPC of the DPCs as a second reference DPC and individually aligning all remaining DPCs, except the first DPC, with the second reference DPC, resulting in a second alignment of the DPCs. The second alignment of the DPCs yields a second value of the alignment metric per each of the DPCs except the first DPC and the second DPC. The processing circuitry is configured to cause the image processing device to select, for each of the DPCs except the first DPC and the second DPC, that of the first alignment of the DPCs and the second alignment of the DPCs yielding best value of the alignment metric.

According to a third aspect there is presented an image processing device for aligning different DPCs of a physical object. The image processing device comprises an obtain module configured to obtain DPCs captured from different orbits around the physical object. The image processing device comprises an align module configured to align the DPCs with each other. The image processing device comprises a first select and align module configured to select, in a first stage, a first DPC of the DPCs as a first reference DPC and individually aligning all remaining DPCs with the first reference DPC, resulting in a first alignment of the DPCs. The first alignment of the DPCs yields a first value of an alignment metric per each of the DPCs except the first DPC. The image processing device comprises a second select and align module configured to select, in a second stage, a second DPC of the DPCs as a second reference DPC and individually aligning all remaining DPCs, except the first DPC, with the second reference DPC, resulting in a second alignment of the DPCs. The second alignment of the DPCs yields a second value of the alignment metric per each of the DPCs except the first DPC and the second DPC. The image processing device comprises a select module configured to select, for each of the DPCs except the first DPC and the second DPC, that of the first alignment of the DPCs and the second alignment of the DPCs yielding best value of the alignment metric.

According to a fourth aspect there is presented a computer program for aligning different DPCs of a physical object, the computer program comprising computer program code which, when run on an image processing device, causes the image processing device to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously, the alignment of the different DPCs of the physical object enable construction of one DPC from images captured during different orbits around the physical object, where one of the different DPCs is generated for each orbit.

Advantageously, these aspects do not suffer from the issues noted above.

Advantageously, these aspects can be used to generate more accurate DPCs than the techniques mentioned above.

Advantageously, these aspects do not require manual interaction or post-processing.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIG. 8 is a schematic diagram showing functional units of an image processing device according to an embodiment;

FIG. 9 is a schematic diagram showing functional modules of an image processing device according to an embodiment; and FIG. 10 shows one example of a computer program product comprising computer readable storage medium according to an embodiment.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

As noted above, there is still a need for improved techniques for constructing a DPC from images captured during different orbits around a physical object.

The embodiments disclosed herein therefore relate to mechanisms for aligning different DPCs of a physical object. In order to obtain such mechanisms there is provided an image processing device 200, a method performed by the image processing device 200, a computer program product comprising code, for example in the form of a computer program, that when run on an image processing device 200, causes the image processing device 200 to perform the method.

Figure 1:
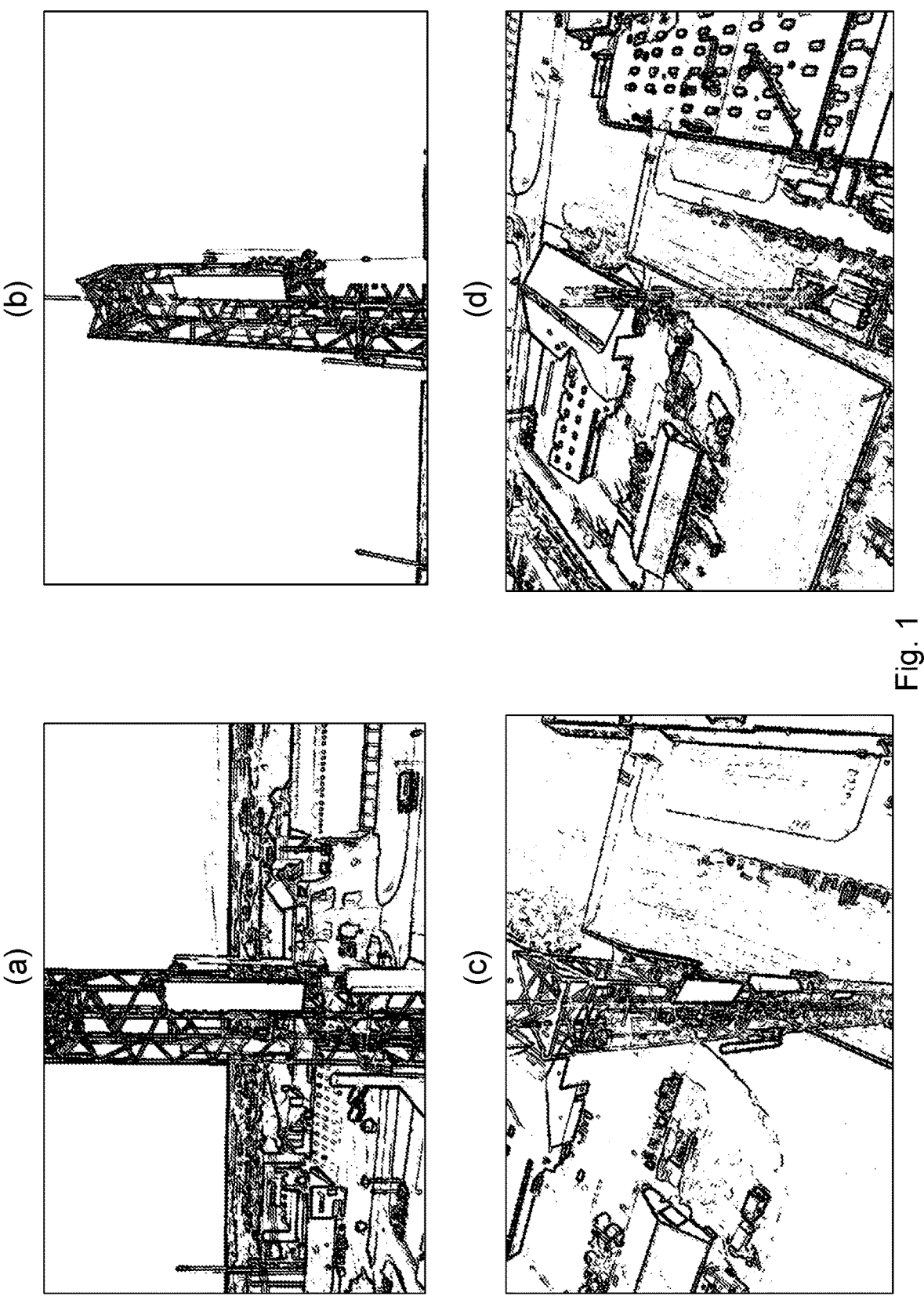
FIG. 1 schematically illustrates different views, taken from different types of orbits, of a telecommunication site.
Figure 2:
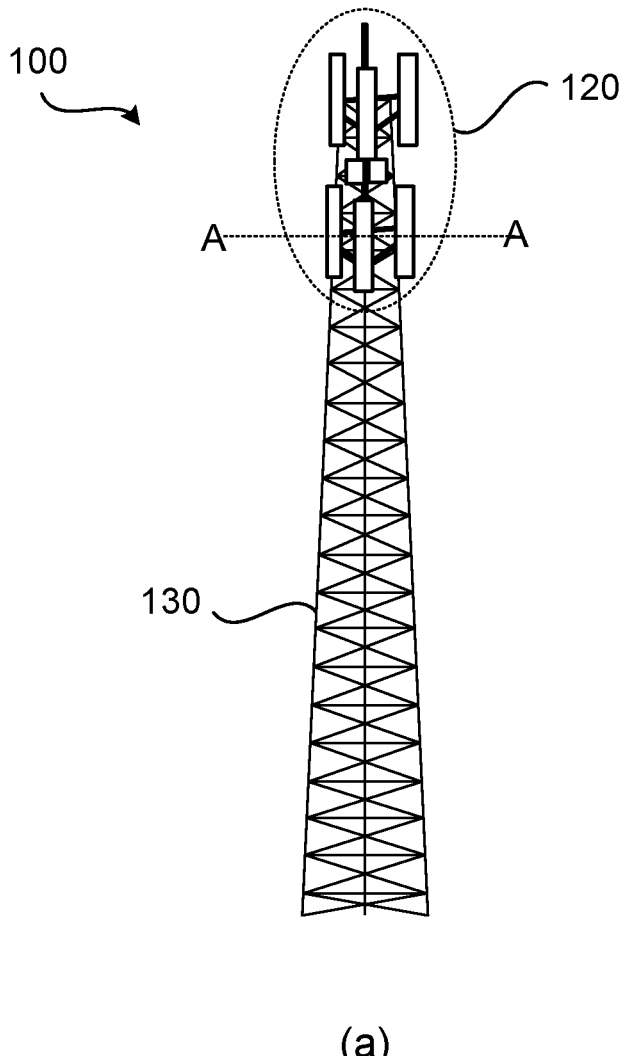
FIG. 2 is a site drawing of a telecommunication site.
Figure 2:
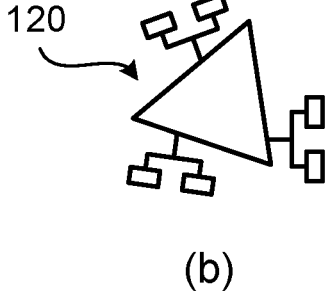
Figure 3:
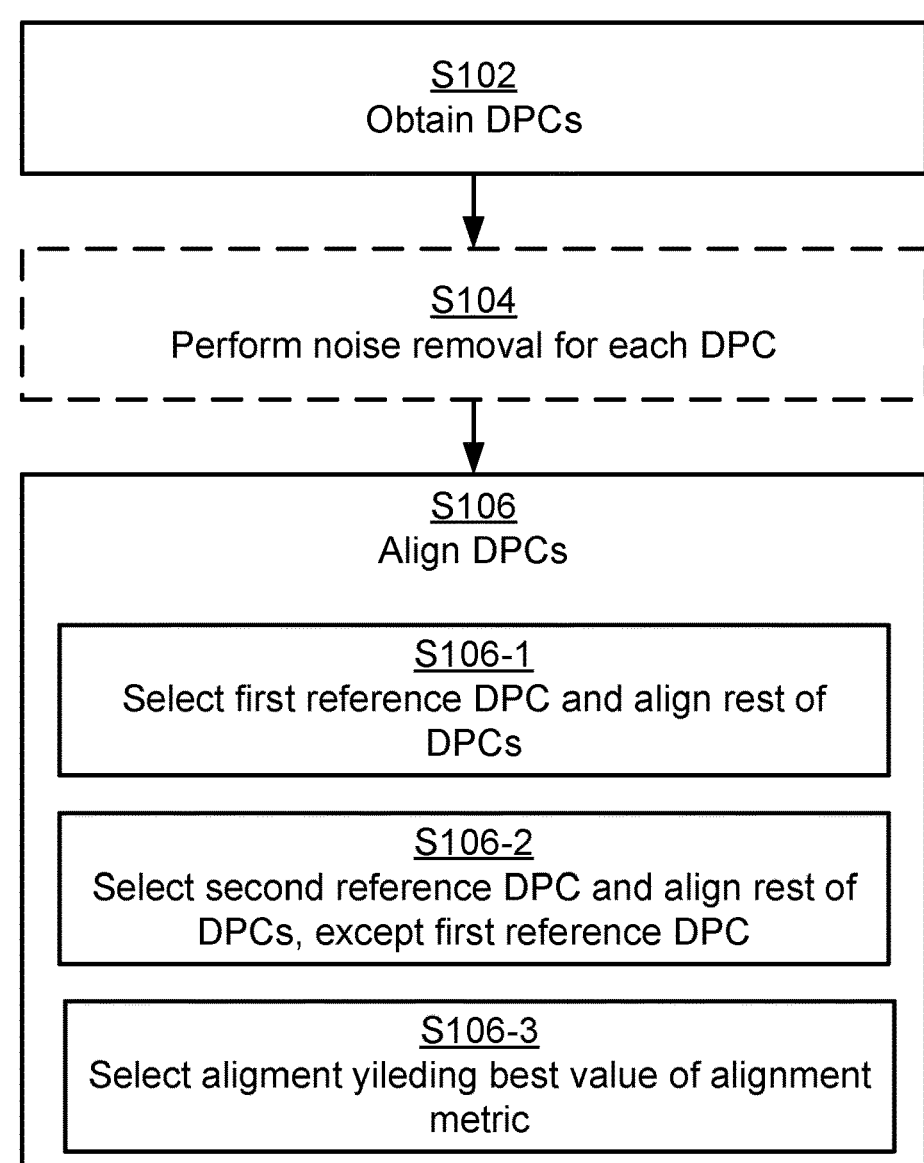
FIGS. 3, 4 and 5 are flowcharts of methods according to embodiments.

FIG. 3 is a flowchart illustrating embodiments of methods for aligning different DPCs of a physical object. The methods are performed by the image processing device 200. The methods are advantageously provided as computer programs 1020.

S102: DPCs captured from different orbits around the physical object are obtained.

The DPCs might not be aligned with each other and therefore step S106 is performed.

S106: The DPCs are aligned with each other.

Performing step S106 involves performing steps S106-1, S106-2, and S106-3.

First, a first alignment of the DPCs is made with a first DPC as reference.

S106-1: In a first stage, a first DPC of the DPCs is selected as a first reference DPC. All remaining DPCs are individually aligned with the first reference DPC. This results in a first alignment of the DPCs. The first alignment of the DPCs yields a first value of an alignment metric per each of the DPCs except the first DPC.

Second, a second alignment of the DPCs (except the first DPC) is made with a second DPC as reference.

S106-2: In a second stage, a second DPC of the DPCs is selected as a second reference DPC. All remaining DPCs, except the first DPC, are individually aligned with the second reference DPC. This results in a second alignment of the DPCs. The second alignment of the DPCs yields a second value of the alignment metric per each of the DPCs except the first DPC and the second DPC.

A selection is then made between the first alignment and the second alignment for each of the DPC (except the first DPC and the second DPC).

S106-3: For each of the DPCs except the first DPC and the second DPC, that of the first alignment of the DPCs and the second alignment of the DPCs yielding best value of the alignment metric is selected.

In other words, a selection is, for each of the DPCs except the first DPC and the second DPC, made between the first alignment and the second alignment. The alignment (either the first or the second) that is best (i.e., yielding best value of the alignment metric) for each DPC is selected. That is, for some of the DPCs, the first alignment might yield best value of the alignment metric and for those DPCs the first alignment is selected, whereas for other of the DPCs, the second alignment might yield best value of the alignment metric and for those DPCs the second alignment is selected.

The thus aligned DPCs can then be overlayed directly onto the first DPC, yielding a final DPC.

The final DPC thus represent a composite DPC where the different DPCs from the different orbits have been combined and aligned. This provides a final DPC with a high level of details, i.e., a high resolution of data points, for visualization and feature extraction. At the same time, the aligned DPCs of each orbit can also facilitate various applications.

Embodiments relating to further details of aligning different DPCs of a physical object as performed by the image processing device 200 will now be disclosed.

In some non-limiting examples, the physical object is a piece of telecommunications equipment, a part of a cell site, or even a complete cell site. In some non-limiting examples, the physical object is a building, or part of a building, such as a balcony.

There could be different uses of the final DPC. In one non-limiting example, the final DPC is used for feature extraction. Feature extraction can be used for identifying details of the physical object. In one non-limiting example, the final DPC is digitally compared to schematics of the physical object. In one non-limiting example, the final DPC is compared to another final DPC of the same physical object. This can be used to detect potential changes over time of the physical object. In one non-limiting example, the final DPC is compared to a final DPC of another physical object. This can be used to detect potential difference between these two physical objects and/or for identification and localization purposes.

The DPCs as captured from different orbits around the physical object could be generated from digital images as captured of the physical object. In some non-limiting examples, the digital images are captures from an image capturing unit mounted on an unmanned aerial vehicle (UAV). In general terms, images should be taken from various orbits to generate DPCs from which the physical object can be reconstructed with fine details. Each of the digital images might comprises exchangeable image file format (EXIF) information. This enables the DPCs to be generated based on the EXIF information. EXIF information in terms of positioning information, camera settings, temporal information, etc. can be used when generating the DPCs. Further, the DPCs might be generated using COL-MAP or Pix4D. These methods can be used to recover a sparse reconstruction of the scene depicting the physical object and camera poses of the input images. The resulting output can be used as the input to multi-view stereo processing to recover a denser reconstruction of the scene.

One DPC is generated for each orbit. There may be different number of DPCs and different examples of the DPC. In some examples there are four DPCs in total; one DPC for a center orbit around the physical object, one DPC for an up-look orbit around the physical object, one DPC for a down-look orbit around the physical object, and one DPC for an overview orbit around the physical object. This is an efficient way to select DPCs that are necessary for viewing the physical object from all angles.

There may be different ways select the first reference DPC. In some embodiments, the first reference DPC is the DPC for the overview orbit. This can be advantageous since the DPC for the overview orbit might cover the whole physical object, and thus cover the same part of the physical object as the other DPCs (but at a comparable lower of detail).

There may be different ways select the second reference DPC. In some embodiments, the second reference DPC is the DPC for the center orbit. This can be advantageous since the DPC for the center orbit might on the one hand partly cover the same part of the physical object as the DPC for the up-look orbit and at the other hand partly cover the same part of the physical object as the DPC for the down-look orbit.

In some aspects, noise removal for the DPCs is performed before the alignment. Particularly, in some embodiment, step S104 is performed:

S104: Noise removal is performed for each of the DPCs before aligning the DPCs with each other.

Noise removal could improve the alignment of the DPCs with each other in S106.

There could be different ways to perform the noise removal in step S104. In some non-limiting examples, the noise removal is performed by a counting-based algorithm. One reason for performing noise removal is to only keep data points that show up in most of the images. Noise removal speeds up the alignment as well as reduces the risk of false positives in the alignment.

Details of how the alignment metric might be computed for the first stage will be disclosed next. In some embodiments, the alignment metric in the first stage, per each of the DPCs except the first DPC, represents an alignment error between the first reference DPC and each of all remaining DPCs. That is, in the first stage each of the DPCs is aligned with the first reference DPC.

Details of how the alignment metric might be computed for the second stage will be disclosed next. In some embodiments, the alignment metric in the second stage, per each of the DPCs except the first DPC and the second DPC, represents an alignment error between the first reference DPC and each of all remaining DPCs, except the second DPC. That is, although in the second stage each of the DPCs (except the first DPC) is aligned with the second reference DPC, the alignment error is still measured between the first reference DPC and each of all remaining DPCs, except the second DPC.

There could be different ways to perform the alignment in the first stage and in the second stage. In some non-limiting examples, the DPCs in the first stage and in the second stage are aligned with each other using an iterative closest point (ICP) algorithm. An ICP algorithm can be used to minimize the difference between two DPCs, where the distance is represented by the alignment error.

Figure 4:
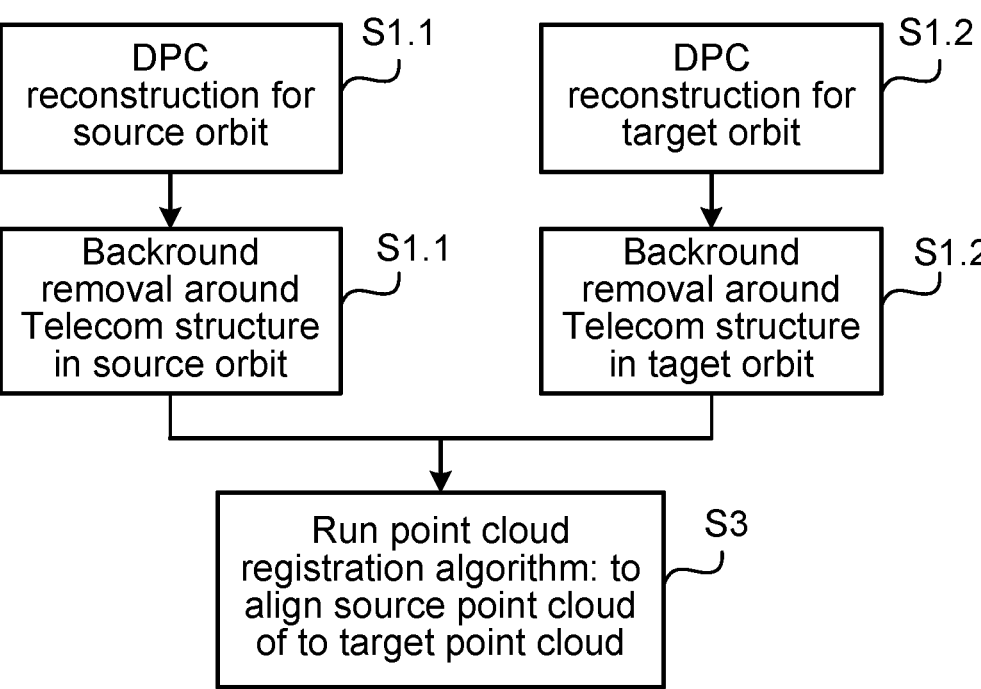

Further details of a typical ICP algorithm as can be used in the herein disclosed embodiments will be disclosed next with reference to the flowchart of FIG. 4.

In general terms, an ICP algorithm can be used to find the best transformation matrix to minimize the difference between two DPCs; a target DPC and a source DPC.

Assume that the source DPC is to be aligned to the target DPC. Assume therefore that a target DPC and a source DPC are acquired, as in steps S1.1 and S1.2. Noise removal is then performed, as in steps S2.1 and S2.2. In step S3 the following two actions are iteratively performed:

Firstly, a corresponding set S={(p, q)} is found from data points p∈P in the target DPC and data points q∈Q in the source DPC, as transformed with a current transformation matrix, denoted T. Each point p is thus matched to a point q.

Secondly, the transformation matrix T is updated by minimizing the objective function E(T) defined as follows:

$$E(T) = \sum_{(p,q)\in S} \|p - Tq\|^2$$

After a certain number of iterations, the objective function E(T) achieves a minimum and the iteration stops.

Finally, with the transformation matrix, the source DPC can now be aligned to the target DPC using the transformation matrix T:

$$Q_{aligned} = Q \cdot T$$

The matrix $Q_{aligned}$ thus represents all points in the source DPC after alignment with the target DPC.

There are different variants of ICP algorithms, for example in terms of how the point clouds are used and the specific objective function used. Different implementations have different advantages. Although having given one representative example of an ICP algorithm above, the herein disclosed embodiments are not limited to this, or any other, specific ICP algorithm.

The Root Mean Square Error (RMSE) between the target DPC and the source DPC can be defined as follows, where N is the number of data points in S:

$$RMSE = \sqrt[2]{\sum_{(p,q)\in S}^{N} (p-q)^2 / N}$$

The RMSE can thus be used to estimate the distance between two DPCs. For instance, if the source DPC is aligned very well to the target DPC, the RMSE should be relatively smaller. Further usage of RMSE will be discussed in the following.

Figure 5:
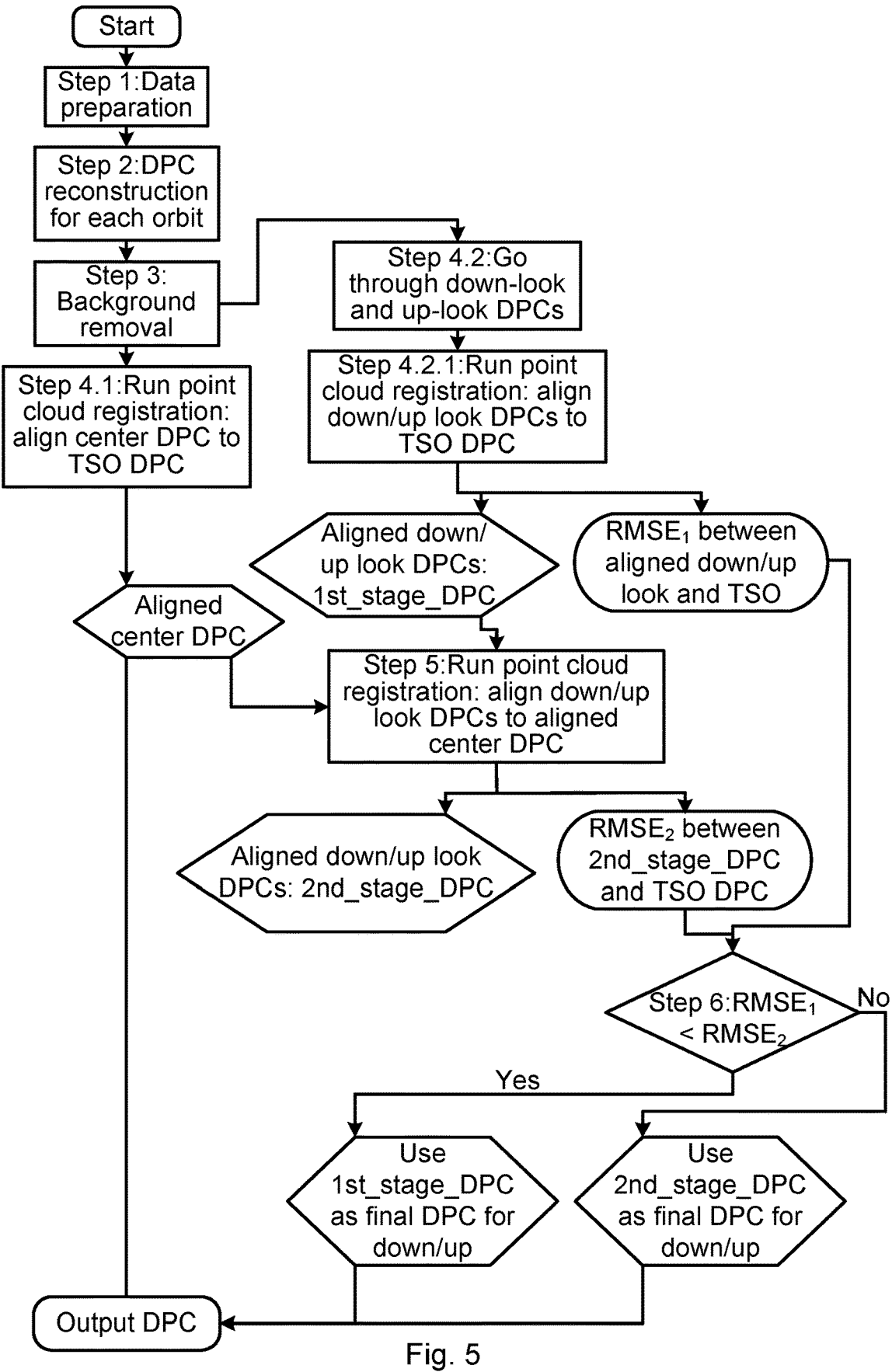

One particular embodiment for aligning different DPCs of a physical object based on at least some of the above embodiments will now be disclosed with reference to the flowchart of FIG. 5.

Step 1: Data preparation is performed. Data preparation involves obtaining the images from the different orbits.

Step 2: DPC reconstruction is performed. DPC reconstruction involves generating one DPC from the images of each orbit. It is here assumed that there are four orbits and thus four DPCs are generated; one DPC for a center orbit around the physical object, one DPC for an up-look orbit around the physical object, one DPC for a down-look orbit around the physical object, and one DPC for an overview orbit around the physical object Step 3: Background removal. Background removal involves removing noise from each of the DPCs.

Point cloud registration is performed in steps 4.1, 4.2, 4.2.1, 5, and 6 as described next.

Step 4.1: The above ICP algorithm is executed with the DPC for the overview orbit as a source DPC and the DPC for the center orbit as target DPC. The DPC for the center orbit is then aligned to the DPC for the overview orbit.

Step 4.2: The DPC for the up-look orbit and the DPC for down-look orbit are then separately aligned with the DPC for the overview orbit and the DPC for the center orbit.

Step 4.2.1: The above ICP algorithm is executed twice with the DPC for the overview orbit as a source DPC; once with the DPC for the up-look orbit as target DPC and once with the DPC for down-look orbit as target DPC. This provides an alignment of the DPC for the up-look orbit and the DPC for down-look orbit to the DPC for the overview orbit. The resulting DPCs are denoted 1st_stage_DPC_up-look and 1st_stage_DPC_down-look. One RMSE (denoted 1st_stage_RMSE_up-look) is computed between 1st_stage_DPC_up-look and the DPC for the overview orbit, and one RMSE (denoted 1st_stage_RMSE_down-look) is computed between 1st_stage_DPC_down-look and the DPC for the overview orbit.

Step 5: The above ICP algorithm is executed twice with the DPC for the center orbit as a source DPC; once with 1st_stage_DPC_up-look as target DPC and once with 1st_stage_DPC_down-look as target DPC. The resulting DPCs are denoted 2nd_stage_DPC_up-look and 2nd_stage_DPC_down-look. One RMSE (denoted 2nd_stage_RMSE_up-look) is computed between 2nd_stage_DPC_up-look and the DPC for the overview orbit, and one RMSE (denoted 2nd_stage_RMSE_down-look) is computed between 2nd_stage_DPC_down-look and the DPC for the overview orbit.

Step 6: A comparison is made between the RMSEs. The DPCs as aligned in steps 4.2.1 and 5 with smallest RMSE are selected. That is, if 1st_stage_RMSE_up-look<2nd_stage_RMSE_up-look, then 1st_stage_DPC_up-look is selected and otherwise 2nd_stage_DPC_up-look is selected. If 1st_stage_RMSE_down-look<2nd_stage_RMSE_down-look, then 1st_stage_DPC_down-look is selected and otherwise 2nd_stage_DPC_down-look is selected.

The best aligned DPCs for the center orbit, the up-look orbit, and the down-look orbit are thus obtained and can be overlayed directly onto the DPC for the overview orbit.

Figure 6:
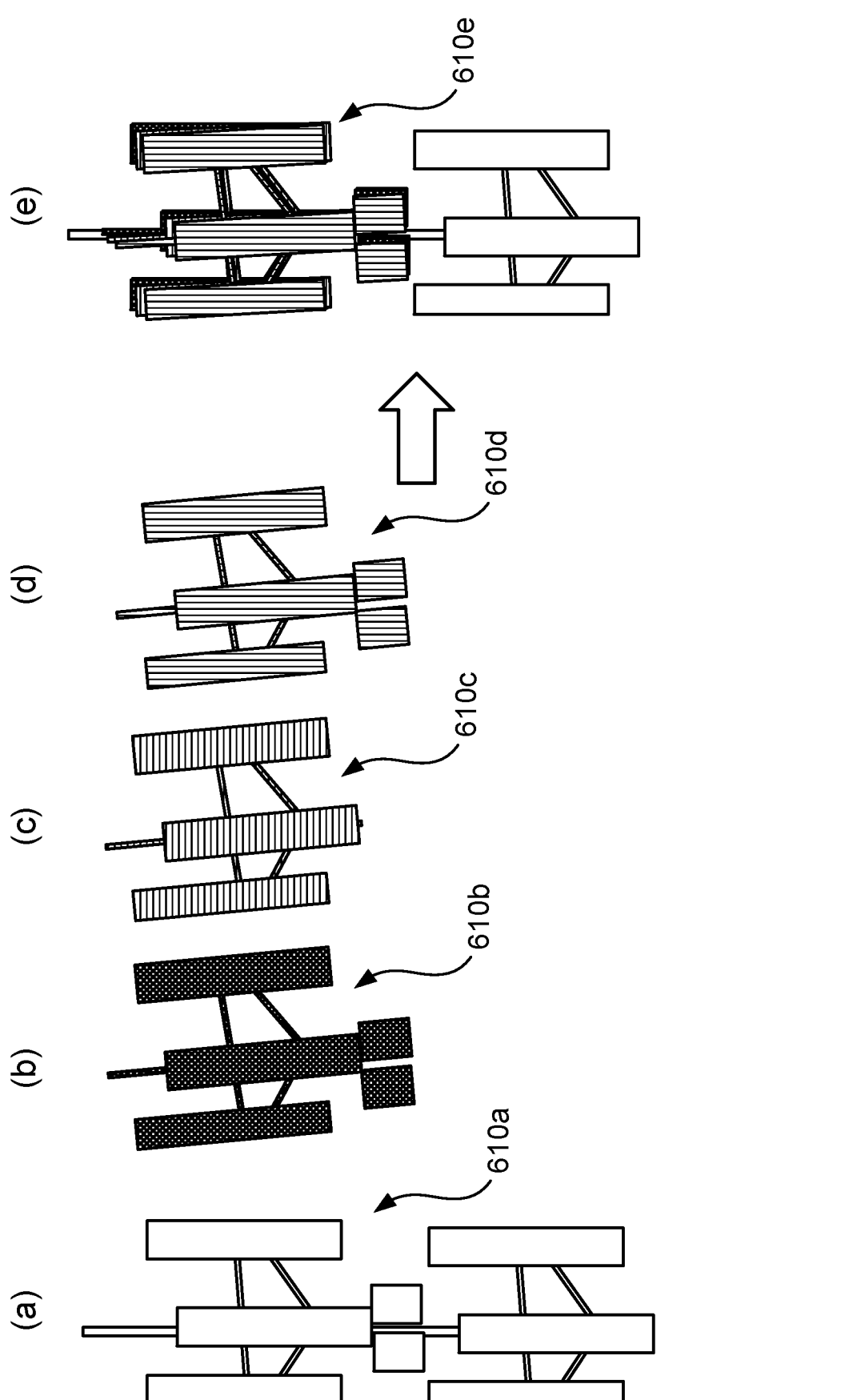
FIGS. 6, and 7 show example simulation results according to embodiments.
Figure 7:
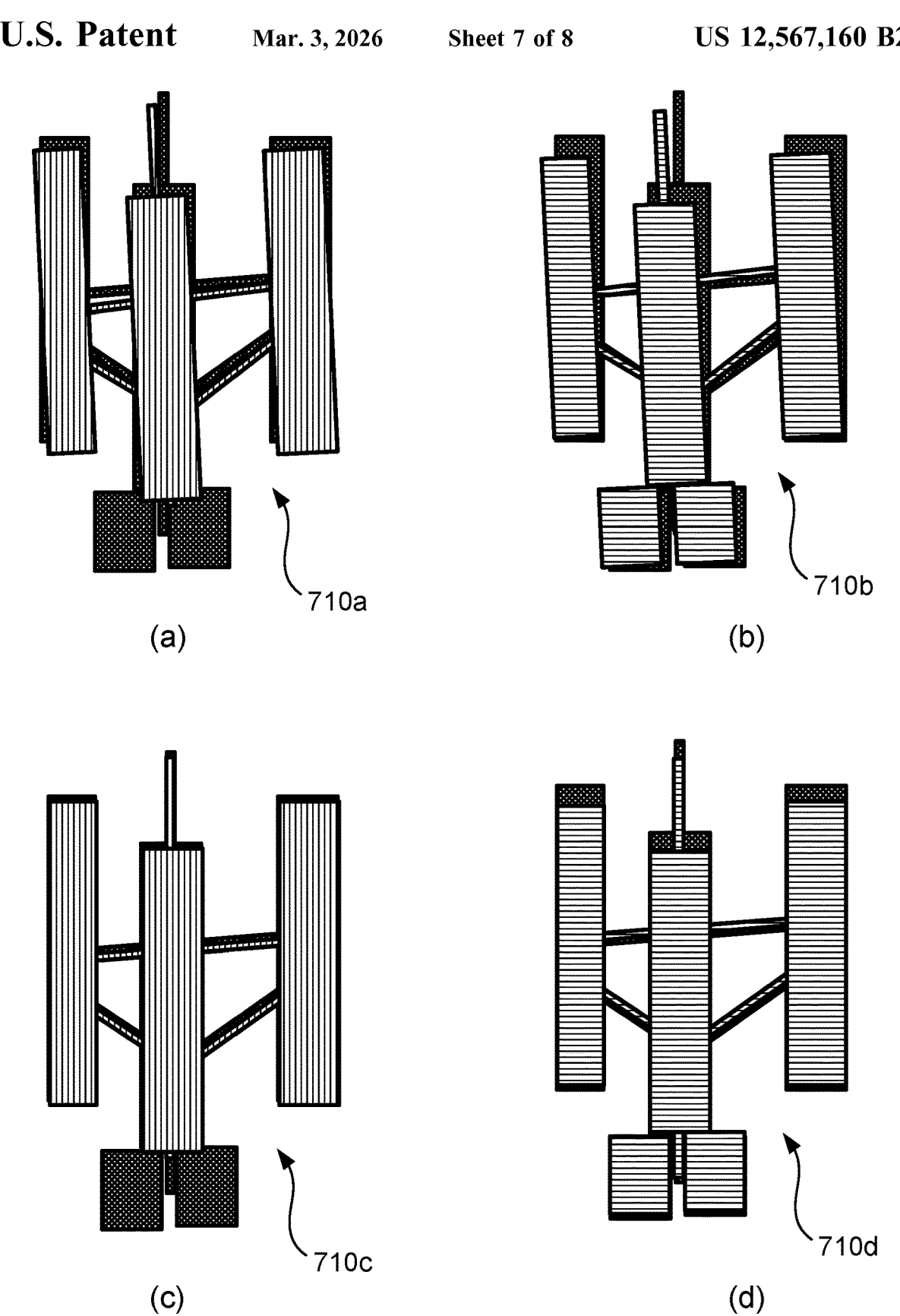

Example simulation results to illustrate some of the above-disclosed embodiments, aspects, and examples will now be presented with reference to FIGS. 6 and 7.

FIG. 6 illustrates an example visualization of alignment between DPCs. The DPC for the overview orbit is the source DPC and is shown at 610a in FIG. 6(*a*). FIG. 6(*b*) shows at 610b the DPC for the center orbit. FIG. 6(*c*) shows at 610c the DPC for the down-look orbit. FIG. 6(*d*) shows at 610d the DPC for the up-look orbit. FIG. 6(*e*) shows at 610e a combination of the DPCs 610a, 610b, 610c, 610d after alignment in step 4.2.1. It can be seen from FIG. 6(*e*) that the DPC for the up-look orbit is not aligned with the remaining DPCs, and especially not with the DPC for the overview orbit.

FIG. 7 illustrates an example visualization of a comparison between DCSs after the alignment in step 4.2.1 and the alignment in step 5. FIG. 6(*a*) shows at 710a a combination of the DPC for the center orbit after alignment in step 4.2.1 and the DPC for the down-look orbit after alignment in step 4.2.1. FIG. 6(*b*) shows at 710b a combination of the DPC for the center orbit after alignment in step 4.2.1 and the DPC for the up-look orbit after alignment in step 4.2.1. FIG. 6(*c*) shows at 710c a combination of the DPC for the center orbit after alignment in step 4.2.1 and the DPC for the down-look orbit after alignment in step 5. FIG. 6(*d*) shows at 710d a combination of the DPC for the center orbit after alignment in step 4.2.1 and the DPC for the up-look orbit after alignment in step 5.

FIG. 8 schematically illustrates, in terms of a number of functional units, the components of an image processing device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1010 (as in FIG. 10), e.g. in the form of a storage medium 230. The processing circuitry 210 may further be provided as at least one application specific integrated circuit (ASIC), or field programmable gate array (FPGA).

Particularly, the processing circuitry 210 is configured to cause the image processing device 200 to perform a set of operations, or steps, as disclosed above. For example, the storage medium 230 may store the set of operations, and the processing circuitry 210 may be configured to retrieve the set of operations from the storage medium 230 to cause the image processing device 200 to perform the set of operations. The set of operations may be provided as a set of executable instructions.

Thus the processing circuitry 210 is thereby arranged to execute methods as herein disclosed. The storage medium

230 may also comprise persistent storage, which, for example, can be any single one or combination of magnetic memory, optical memory, solid state memory or even remotely mounted memory. The image processing device 200 may further comprise a communications interface 220 at least configured for communications with other entities. As such the communications interface 220 may comprise one or more transmitters and receivers, comprising analogue and digital components. The processing circuitry 210 controls the general operation of the image processing device 200 e.g. by sending data and control signals to the communications interface 220 and the storage medium 230, by receiving data and reports from the communications interface 220, and by retrieving data and instructions from the storage medium 230. Other components, as well as the related functionality, of the image processing device 200 are omitted in order not to obscure the concepts presented herein.

FIG. 9 schematically illustrates, in terms of a number of functional modules, the components of an image processing device 200 according to an embodiment. The image processing device 200 of FIG. 9 comprises a number of functional modules; an obtain module 210a configured to perform step S102, an align module 210c configured to perform step S106, a first select and align module 210d configured to perform step S106-1, a second select and align module 210e configured to perform step S106-2, and a select module 210f configured to perform step S106-3. The image processing device 200 of FIG. 9 may further comprise a number of optional functional modules, such as any a noise removal module 210b configured to perform step S104. In general terms, each functional module 210a:210f may in one embodiment be implemented only in hardware and in another embodiment with the help of software, i.e., the latter embodiment having computer program instructions stored on the storage medium 230 which when run on the processing circuitry makes the image processing device 200 perform the corresponding steps mentioned above in conjunction with FIG. 10. It should also be mentioned that even though the modules correspond to parts of a computer program, they do not need to be separate modules therein, but the way in which they are implemented in software is dependent on the programming language used. Preferably, one or more or all functional modules 210a:210f may be implemented by the processing circuitry 210, possibly in cooperation with the communications interface 220 and/or the storage medium 230. The processing circuitry 210 may thus be configured to from the storage medium 230 fetch instructions as provided by a functional module 210a:210f and to execute these instructions, thereby performing any steps as disclosed herein.

The image processing device 200 may be provided as a standalone device or as a part of at least one further device. Thus, a first portion of the instructions performed by the image processing device 200 may be executed in a first device, and a second portion of the of the instructions performed by the image processing device 200 may be executed in a second device; the herein disclosed embodiments are not limited to any particular number of devices on which the instructions performed by the image processing device 200 may be executed. Hence, the methods according to the herein disclosed embodiments are suitable to be performed by an image processing device 200 residing in a cloud computational environment. Therefore, although a single processing circuitry 210 is illustrated in FIG. 8 the processing circuitry 210 may be distributed among a plurality of devices, or nodes. The same applies to the functional modules 210a:210f of FIG. 9 and the computer program 1020 of FIG. 10.

FIG. 10 shows one example of a computer program product 1010 comprising computer readable storage medium 1030. On this computer readable storage medium 1030, a computer program 1020 can be stored, which computer program 1020 can cause the processing circuitry 210 and thereto operatively coupled entities and devices, such as the communications interface 220 and the storage medium 230, to execute methods according to embodiments described herein. The computer program 1020 and/or computer program product 1010 may thus provide means for performing any steps as herein disclosed.

In the example of FIG. 10, the computer program product 1010 is illustrated as an optical disc, such as a CD (compact disc) or a DVD (digital versatile disc) or a Blu-Ray disc. The computer program product 1010 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1020 is here schematically shown as a track on the depicted optical disk, the computer program 1020 can be stored in any way which is suitable for the computer program product 1010.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for aligning different dense point clouds (DPCs) of a physical object, the method being performed by an image processing device, the method comprising:

obtaining DPCs captured from different orbits around the physical object; and aligning the DPCs with each other by performing a process comprising:

selecting, in a first stage, a first DPC of the DPCs as a first reference DPC;

for each DPC except the first reference DPC, aligning the DPC with the first reference DPC, resulting in a first alignment of the DPC, the first alignment of the DPC yielding a first value of an alignment metric for the DPC;

selecting, in a second stage, a second DPC of the DPCs as a second reference DPC;

for each DPC except the first reference DPC and the second reference DPC, aligning the DPC with the second reference DPC or the first alignment of the second DPC, resulting in a second alignment of the DPC, the second alignment of the DPC yielding a second value of the alignment metric for the DPC; and for each of the DPCs except the first DPC and the second DPC, selecting the first alignment of the DPC or the second alignment of the DPC based on: (i) the first value of the alignment metric for the DPC and (ii) the second value of the alignment metric for the DPC.

2. The method of claim 1, wherein there are four DPCs in total:

one DPC for a center orbit around the physical object, one DPC for an up-look orbit around the physical object, one DPC for a down-look orbit around the physical object, and one DPC for an overview orbit around the physical object.

3. The method of claim 2, wherein the first reference DPC is the DPC for the overview orbit.

4. The method of claim 2, wherein the second reference DPC is the DPC for the center orbit.

5. The method of claim 1, wherein the method further comprises:

performing noise removal for each of the DPCs before aligning the DPCs with each other.

6. The method of claim 5, wherein the noise removal is performed by a counting-based algorithm.

7. The method of claim 1, wherein the alignment metric in the first stage for the DPC represents an alignment error between the first reference DPC and the DPC.

8. The method of claim 1, wherein the alignment metric in the second stage for the DPC represents an alignment error between the DPC and either the second reference DPC or the first alignment of the second DPC.

9. The method of claim 1, wherein the DPCs in the first stage and in the second stage are aligned with each other using an iterative closest point (ICP) algorithm.

10. The method of claim 1, wherein the DPCs are generated from digital images captured of the physical object.

11. The method of claim 10, wherein each of the digital images comprises exchangeable image file format (EXIF) information, and wherein the DPCs are generated based on the EXIF information.

12. The method of claim 10, wherein the digital images are captures from an image capturing unit mounted on an unmanned aerial vehicle, UAV.

13. The method of claim 1, wherein the DPCs are generated using COLMAP or Pi10D.

14. The method of claim 1, wherein the physical object is a piece of telecommunications equipment, a part of a cell site, or a complete cell site.

15. The method of claim 1, wherein the physical object is a building, or part of a building, such as a balcony.

16. An image processing device for aligning different dense point clouds (DPCs) of a physical object, the image processing device comprising processing circuitry, the processing circuitry being configured to cause the image processing device to:

obtain DPCs captured from different orbits around the physical object; and align the DPCs with each other by performing a process comprising:

selecting, in a first stage, a first DPC of the DPCs as a first reference DPC;

for each DPC except the first reference DPC, aligning the DPC with the first reference DPC, resulting in a first alignment of the DPC, the first alignment of the DPC yielding a first value of an alignment metric for the DPC;

selecting, in a second stage, a second DPC of the DPCs as a second reference DPC;

for each DPC except the first reference DPC and the second reference DPC, aligning the DPC with the second reference DPC or the first alignment of the second DPC, resulting in a second alignment of the DPC, the second alignment of the DPC yielding a second value of the alignment metric for the DPC; and for each of the DPCs except the first DPC and the second DPC, selecting the first alignment of the DPC or the second alignment of the DPC based on: (i) the first value of the alignment metric for the DPC and (ii) the second value of the alignment metric for the DPC.

17. The image processing device of claim 16, wherein there are four DPCs in total:

one DPC for a center orbit around the physical object, one DPC for an up-look orbit around the physical object, one DPC for a down-look orbit around the physical object, and one DPC for an overview orbit around the physical object.

18. A non-transitory computer readable storage medium storing a computer program for aligning different dense point clouds (DPCs) of a physical object, the computer program comprising computer code which, when run on processing circuitry of an image processing device, causes the image processing device to:

obtain DPCs captured from different orbits around the physical object; and align the DPCs with each other by performing a process comprising:

selecting, in a first stage, a first DPC of the DPCs as a first reference DPC;

for each DPC except the first reference DPC, aligning the DPC with the first reference DPC, resulting in a first alignment of the DPC, the first alignment of the DPC yielding a first value of an alignment metric for the DPC;

selecting, in a second stage, a second DPC of the DPCs as a second reference DPC;

for each DPC except the first reference DPC and the second reference DPC, aligning the DPC with the second reference DPC or the first alignment of the second DPC, resulting in a second alignment of the DPC, the second alignment of the DPC yielding a second value of the alignment metric for the DPC; and for each of the DPCs except the first DPC and the second DPC, selecting the first alignment of the DPC or the second alignment of the DPC based on: (i) the first value of the alignment metric for the DPC and (ii) the second value of the alignment metric for the DPC.

19. The non-transitory computer readable storage medium of claim 18, wherein there are four DPCs in total:

one DPC for a center orbit around the physical object, one DPC for an up-look orbit around the physical object, one DPC for a down-look orbit around the physical object, and one DPC for an overview orbit around the physical object.

\* \* \* \* \*